(No Model.)
G. A. PORTER.
CRANK LUBRICATOR.
No. 317,191. Patented May 5, 1885.
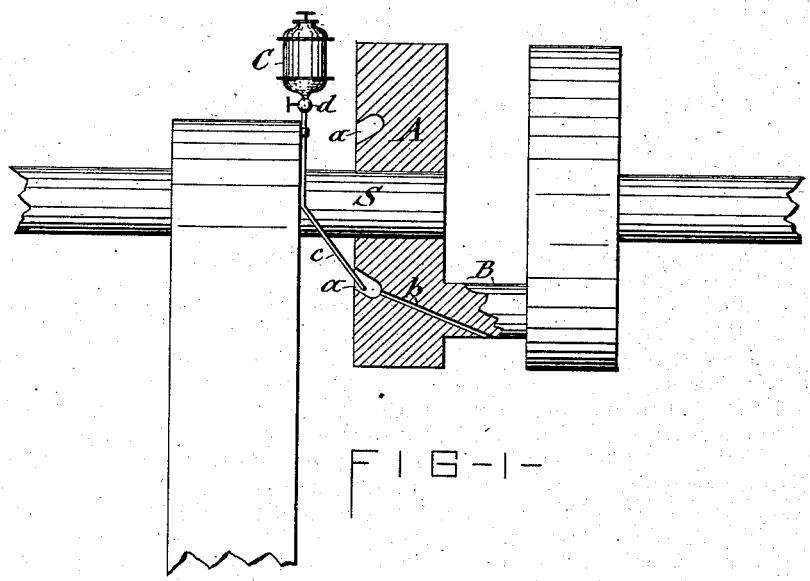
FIG-1-
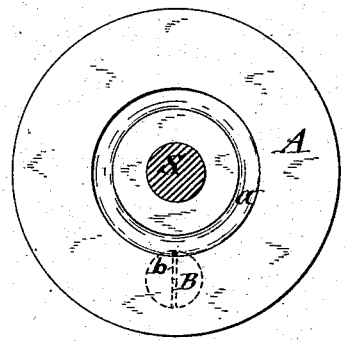
FIG-2-
ATTEST—
Wm. C. Raymond
J. H. Gibbs
INVENTOR—
George A. Porter

UNITED STATES PATENT OFFICE.

GEORGE A. PORTER, OF SYRACUSE, NEW YORK.

CRANK-LUBRICATOR.

SPECIFICATION forming part of Letters Patent No. 317,191, dated May 5, 1885.

Application filed March 18, 1885. (No model.)

*To all whom it may concern:*

Be it known that I, GEORGE A. PORTER, of Syracuse, in the county of Onondaga, in the State of New York, have invented new and useful Improvements in Crank-Lubricators, of which the following, taken in connection with the accompanying drawings, is a full, clear, and exact description.

The purpose of this invention is to lubricate the wrists of high-speed cranks; and it consists, essentially, in the combination, with a crank, of an annular lubricant-conduit arranged rotary around the shaft or axis of the crank and on a line described with a radius shorter than the distance between the axis of the crank and farthest side of the wrist-pin, and a duct extending from the aforesaid conduit to the said side of the wrist-pin, whereby the lubricant is forced toward the wrist-bearing by the centrifugal force of the revolving crank, all as hereinafter more fully explained and specifically claimed.

In the annexed drawings, Figure I is a vertical transverse section of a crank provided with my improvement, and Fig. II is a rear face view of the same.

Similar letters of reference indicate corresponding parts.

A represents a crank in the form of a circular disk, mounted on a rotary axis or shaft, S, and B denotes the wrist-pin with which the pitman or the reciprocating rod of an engine is connected in the usual and well-known manner, (not here illustrated.)

*a* represents an annular channel or conduit, formed in the rear surface of the crank A and concentric with the axis S thereof. Said conduit is thus made to rotate with the crank, and in order to enable it to carry a certain amount of lubricant I undercut the conduit at the side toward the periphery of the crank-disk A, as shown in Fig. I of the drawings. The conduit *a* is arranged on a line described by a radius shorter than the distance between the shaft or axis of the crank and farthest side of the wrist-pin, and from the conduit *a* is extended a duct, *b*, through the disk A, and through the wrist-pin B, and terminates at the latter at the side farthest from the shaft or axis of the crank.

The operation of my invention is as follows, to wit: A suitable lubricant reservoir or cup, C, is secured to a suitable stationary support and supplied with lubricant, and with a discharge-pipe, *c*, leading to the channel or conduit *a*, and with a stop-cock, *d*, to control the flow of the lubricant. The cup C being arranged stationary renders the same easy of access for replenishing it. The lubricant is introduced into the conduit *a* by opening the stop-cock *d*. Inasmuch as the said conduit is concentric with the axis of the crank, the pipe *c* is maintained in communication with the conduit *a* during the revolution of the crank; hence the flow of the lubricant from the cup C to the conduit *a* is uninterrupted so long as the cup is properly supplied with the lubricant and the stop-cock *d* is open. The centrifugal force of the rotating crank carries the lubricant into the under-cut portion of the conduit *a* and from thence through the duct *b* to the exterior of the wrist-pin B. Thus it will be observed the flow of the lubricant from the conduit *a* to the wrist-pin is accelerated by the increase of the speed of the crank, and consequently the supply of lubricant to the wrist-pin is, in a measure, regulated automatically and in accordance with the demand.

I do not limit my invention to the formation of the channel *a* in the side of the cam-disk, as shown, inasmuch as an annular trough or conduit may be attached to and caused to rotate with the crank arm or disk A or the shaft to which the crank is attached, in which case a branch pipe is extended from the aforesaid pipe to the duct *b*.

I am aware that prior to my present invention oil-cups have been connected to wrist-pins of cranks, and made to communicate with the side of said pin by a duct extending through the same; but it is obvious that such a contrivance does not possess the advantages of my invention. The cup moving with the wrist-pin renders it almost impossible to replenish it while the crank is revolving at a high speed. Furthermore, the flow of oil is not accelerated by the centrifugal force of the revolving crank.

What I claim as my invention is—

1. A crank-lubricator comprising a conduit extending around the axis of the crank and arranged rotary therewith and on a line described by a radius shorter than the distance between the axis of the crank and the farthest side of the wrist-pin, and a duct extending from the aforesaid conduit to the side of the wrist-pin, substantially as and for the purpose set forth.

2. The combination, with a crank, of an annular lubricant-conduit arranged concentric and rotary with the axis of the crank, a duct extending from the aforesaid conduit to the side of the wrist-pin, and a lubricant-cup secured to a stationary support and communicating with the annular conduit, substantially as specified.

3. The within-described crank-lubricator, consisting of a disk fixed to a rotary axis, a wrist-pin attached to said disk, an annular undercut channel in the rear side of the disk and concentric with the axis thereof, and a duct extending from said channel through the disk and through the wrist-pin and terminating at the side of the latter, substantially as described and shown.

In testimony whereof I have hereunto signed my name and affixed my seal, in the presence of two attesting witnesses, at Syracuse, in the county of Onondaga, in the State of New York, this 14th day of March, 1885.

GEORGE A. PORTER. [L. S.]

Witnesses:
STEWART WORDEN,
W. F. JONES.